United States Patent
Colletto (10) Patent No.: US 11,767,678 B2
(45) Date of Patent: Sep. 26, 2023

(54) SYSTEM FOR THE REMOVAL OF VOLATILE PRODUCTS RESULTING FROM THE DISINFECTION OF WATER IN A SWIMMING POOL

(71) Applicant: A & T EUROPE S.P.A., Castiglione delle Stiviere (IT)

(72) Inventor: Roberto Colletto, Padenghe sul Garda (IT)

(73) Assignee: A & T EUROPE S.P.A., Castiglione delle Stiviere (IT)

( * ) Notice: Subject to any disclaimer, the term of this patent is extended or adjusted under 35 U.S.C. 154(b) by 76 days.

(21) Appl. No.: 17/447,846

(22) Filed: Sep. 16, 2021

(65) Prior Publication Data

US 2022/0090402 A1    Mar. 24, 2022

(30) Foreign Application Priority Data

Sep. 22, 2020   (IT) .......................... 102020000022303

(51) Int. Cl.
*E04H 4/12* (2006.01)
*C02F 1/20* (2023.01)
(Continued)

(52) U.S. Cl.
CPC .............. *E04H 4/1227* (2013.01); *C02F 1/20* (2013.01); *E04H 4/1272* (2013.01);
(Continued)

(58) Field of Classification Search
CPC ... E04H 4/1227; E04H 4/1272; E04H 4/1281; C02F 1/20; C02F 2101/12; C02F 2103/42
(Continued)

(56) References Cited

U.S. PATENT DOCUMENTS

| | | | |
|---|---|---|---|
| 4,051,562 A | 10/1977 | Jakowicki | |
| 6,451,209 B1 * | 9/2002 | Kaas | ......................... C02F 9/00 |
| | | | 210/257.2 |
| 8,999,027 B1 | 4/2015 | Baxter | |

FOREIGN PATENT DOCUMENTS

| | | | |
|---|---|---|---|
| FR | 2 922 204 A1 | | 4/2009 |
| WO | WO 2019/183411 | * | 9/2019 |

OTHER PUBLICATIONS

Italian Search Report dated May 20, 2021 in Italian Application 102020000022303 filed on Sep. 22, 2020, citing documents AA-AB & AO therein, 3 pages (with English Translation of Categories of Cited Documents)

* cited by examiner

*Primary Examiner* — Fred Prince
(74) *Attorney, Agent, or Firm* — Oblon, McClelland, Maier & Neustadt, L.L.P.

(57) ABSTRACT

A system for the removal of volatile products resulting from the disinfection of water in a swimming pool, including a main channel arranged at an edge of a swimming pool and to collect overflowing water from the pool, air suction holes distributed along the main channel, the suction holes facing the internal volume of the main channel and being arranged at a height above the free water surface in the main channel, ventilation device configured to generate a suction flow of air from the suction holes. The system includes an air insufflation device arranged in the main channel at a height below the free surface of the water in the main channel, the air insufflation device generating a flow of air to strip the gases dissolved in the water in the main channel, from the liquid phase to the gaseous phase.

15 Claims, 7 Drawing Sheets

(51) Int. Cl.
  *C02F 103/42* (2006.01)
  *C02F 101/12* (2006.01)
(52) U.S. Cl.
  CPC ...... *C02F 2101/12* (2013.01); *C02F 2103/42* (2013.01); *E04H 4/1281* (2013.01)
(58) Field of Classification Search
  USPC .................. 210/167.1, 167.12, 167.15, 903
  See application file for complete search history.

SYSTEM FOR THE REMOVAL OF VOLATILE PRODUCTS RESULTING FROM THE DISINFECTION OF WATER IN A SWIMMING POOL

The present invention refers to a system for the removal of volatile products, so-called DBPs ("disinfection by-products") resulting from the disinfection of water in a swimming pool.

As is well known, swimming pool water is constantly subjected to chemical disinfection treatments, aimed at removing, deactivating or killing pathogenic microorganisms that are introduced into the water by bathers.

However, the chemicals used for such disinfection lead to the generation of contaminating and harmful substances, several of which are volatile, i.e., the aforementioned DBPs, including chloramines and halomethanes, which, being heavier than air, tend to accumulate in the environment just above the pool, causing health problems for users. These volatile substances accumulate in the 'breath zone' of the pool and therefore irritate the respiratory tracts, eyes and skin of bathers or of pool staff. In addition, the movements of the swimmers cause agitation of the surface water of the pool, which promotes the release, and consequently the accumulation, of volatile contaminants from the pool water in the vicinity of the swimmers.

Today, the removal of harmful volatile substances which are released from swimming pool water is generally carried out by means of environmental ventilation systems that are part of the HVAC (Heating, Ventilation and Air Conditioning) systems in swimming pools. These systems recirculate and treat the ambient air present inside the pool facility.

The main purpose of these systems is to regulate the temperature and humidity in the facility where the pool is located, not only in the areas occupied by users, but also near the roof of the facility itself, where hot and humid air tends to accumulate, in order to prevent the degradation of the air itself. For this reason, the air vents are generally located in the upper part of the facility, thus away from the region most affected by the accumulation of DBPs.

For this reason, and due to the fact that these environmental ventilation systems essentially cover the entire environmental volume of the swimming pool facility, they are not very efficient in removing the volatile substances that are formed near the free surface of the water and that tend to remain and accumulate in this area which, as mentioned above, constitutes the so-called "breath zone".

The main task of the present invention is to develop a system for the removal of volatile products resulting from the disinfection of water in a swimming pool that overcomes the limits of the known technique by enabling the effective removal of harmful volatile substances generated by water disinfection.

In the context of this task, one aim of the present invention is to realise a system for the removal of volatile products deriving from the disinfection of water in a swimming pool which prevents the accumulation of volatile substances in the environment above and around the pools of a swimming pool.

Another aim of the invention is to create a system for the removal of volatile products resulting from the disinfection of water in a swimming pool that can be easily installed in a newly built facility or in an existing facility to be renovated.

A further aim of the invention is to create a system for the removal of volatile products resulting from the disinfection of water in a swimming pool that is able to provide the broadest guarantees of reliability and safety in use.

Another aim of the invention is to create a system for the removal of volatile products resulting from the disinfection of water in a swimming pool that is economically competitive compared to the known technique.

The above-mentioned task, as well as the purposes mentioned and others which will better appear later, are achieved by a system for removing volatile products resulting from the disinfection of water in a swimming pool as provided in claim 1.

Other features are comprised in the dependent claims.

Further features and advantages will result from the description of a preferred, but not exclusive, embodiment of a system for the removal of volatile products resulting from the disinfection of water in a swimming pool, illustrated by way of non-limiting example with the aid of the attached drawings in which.

With reference to the figures mentioned, the system for the removal of products resulting from the disinfection of water in a swimming pool, indicated globally by reference number 1, comprises:

a main channel 2 configured to be arranged at at least one edge of a pool 3 of a swimming pool facility and adapted to collect overflowing water from the pool 3, a first plurality of air suction holes 4 distributed along the extension direction of the main channel 2, wherein said air suction holes 4 face towards the internal volume of the main channel 2, wherein the water collected therein is present, and wherein said air suction holes 4 are arranged at a height above the free water surface present in the main channel 2, ventilation means 6 configured to generate a suction flow of air from such suction holes 4.

Figure 1:
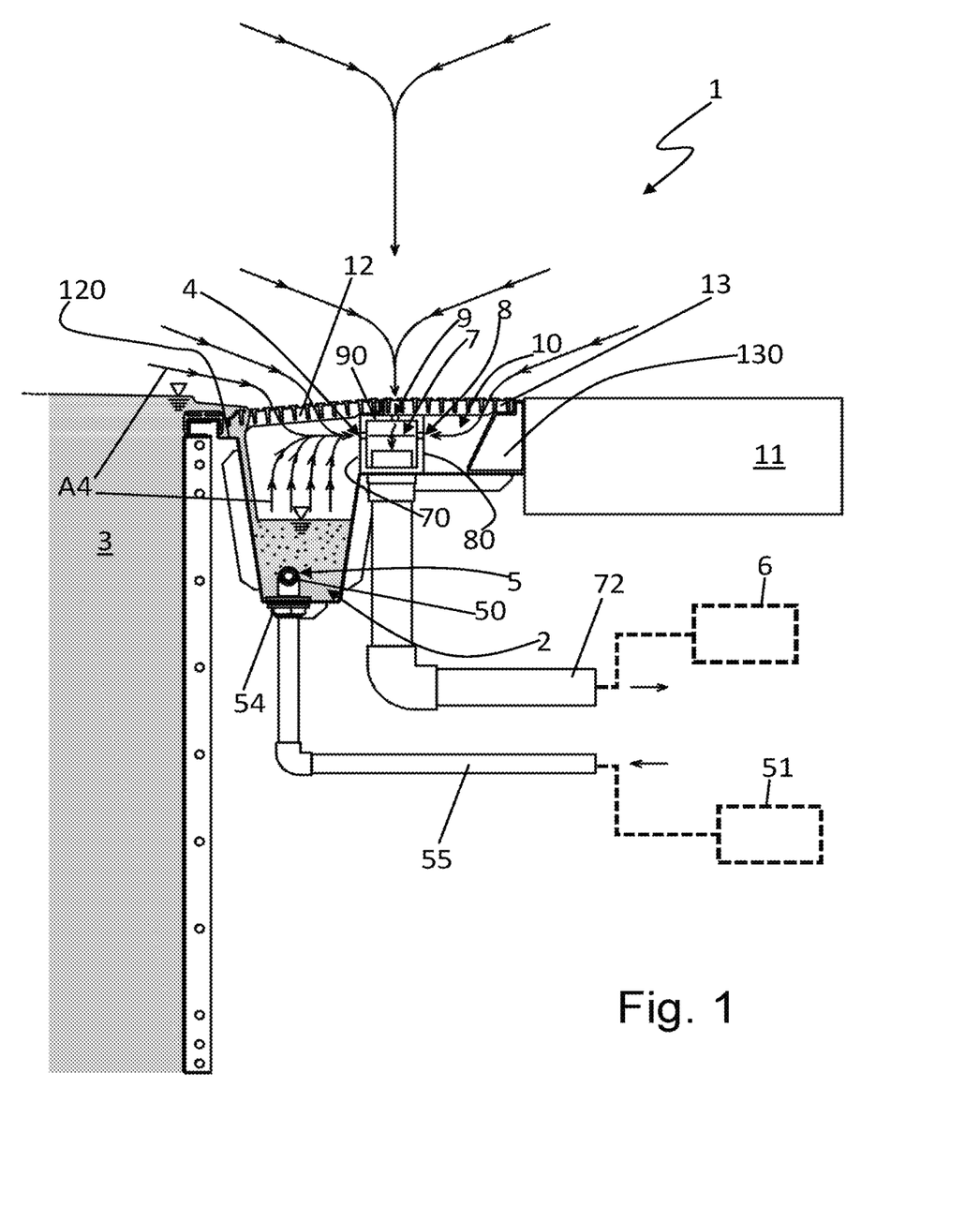
FIG. 1 is a cross-section schematic view of an embodiment of a system for the removal of volatile products resulting from the disinfection of water in a swimming pool, according to the invention.

The flows of air sucked in through the first plurality of suction holes 4, thanks to the aforementioned ventilation means 6, are indicated, in FIG. 1, by reference A4. In essence, therefore, the suction holes 4 are air suction mouths or ports.

According to the invention, the system 1 comprises an air insufflation device 5 arranged in the main channel 2 at a height below the free water surface present in the main channel 2. Such air insufflation device 5 is designed to generate a flow of air within the water present in the main channel 2 adapted for the stripping of the gases dissolved in the water present in the main channel 2, so as to promote their passage from the liquid phase to the gaseous phase. The gases stripped from the water in the main channel 2 are therefore sucked by the aforementioned first plurality of suction holes 4 and thus removed from the main channel 2 to then be discharged outside the pool facility.

The presence of the air insufflation device 5 in the main channel 2 actively forces the release of harmful volatile substances present in the water into a confined space, i.e. inside the main channel 2, and the direct suction of the same in the vicinity of the main channel 2 itself, i.e. precisely where the removal of volatile substances is facilitated and more efficient, compared for example with other areas of the pool facility. In this way it is possible both to prevent, at least in part, the release of harmful volatile substances into other areas of the pool 3, and to prevent harmful volatile substances, whose stripping has been forced to take place in the main channel 2, from moving elsewhere once they have passed into the gaseous phase.

As illustrated in the accompanying figures, the main channel 2 is adapted to collect the water overflowing from the pool 3 through at least one first grate 12. Furthermore, the suction holes 4 are arranged below such at least one first grate 12 and, as mentioned, at a higher height than the height of the free water surface present in the main channel 2. Such suction holes 4 are adapted to suck in the air present in the main channel 2.

Advantageously, the air insufflation device 5 comprises means for generating a flow of air 51 under pressure, in fluid communication with a perforated duct 50, continuous or consisting of several sections in sequence, which extends along the extension direction of the main channel 2, wherein at least the portion having holes for the outlet of the insufflated air from such perforated duct 50 is immersed in the water present in the main channel 2.

Advantageously, the perforated duct 50 consists of a microperforated tube or a porous tube.

The perforated duct 50 can therefore extend along the entire length of the main channel 2, and thus generate insufflated air substantially uniformly along the entire length of such main channel 2.

Advantageously, the main channel 2 may be arranged along at least one side of the pool 3, or along two opposite sides of the pool 3, preferably along the two longest sides, or around the entire perimeter of the pool 3, at the overflow edge where the water of the pool 3 overflows.

The main channel 2 is in fluid communication, by means of outlet drains 20 arranged on the bottom of the channel 2 itself, and of a relative outlet duct 21, with a compensation tank 22, where the water of the pool 3 is collected to be treated and returned to the pool. Such outlet drains 20 may be provided with a shutter or valves to regulate the water level in the main channel 2.

In this way, the stripping of harmful gaseous components present in the water of pool 3 mainly affects the portion of water conveyed towards the compensation tank 22, thus also preserving the technical room where the compensation tank 22 and the machinery contained therein is located from the exhalation of harmful and corrosive gases.

Therefore, since it intercepts all the water from the pool 3 directed to the compensation tank 22, the system 1 is able to treat substantially all the recirculation flow, stripping the dissolved gases in all the water that recirculates in the swimming pool water circulation, filtration, treatment and purification system.

As illustrated in particular in FIGS. 1 to 6, the suction holes 4 can be formed on a wall, in a generic sense, of the main channel 2.

Advantageously, the system 1 comprises a suction duct 7 which runs parallel to the main channel 2. The first plurality of suction holes, indicated by reference number 4, is formed on a first wall 70 of such suction duct 7 facing the inner volume of the main channel 2.

As illustrated in particular in FIGS. 1 to 5, the first wall 70 of the suction duct 7, where the suction holes 4 are formed, is also part of the side wall of the main channel 2, i.e., a side wall of the main channel 2 is partly defined by the first wall 70 of the suction duct 7.

The suction duct 7 is in fluid communication with the ventilation means 6, by means of a connecting duct 72.

In this way the gases stripped from the water in the main channel 2 can be sucked, through the suction holes 4, into the suction duct 7, and from there pushed, either to the atmosphere outside the pool, or to a system for their separation from the air. In this way, harmful volatile substances do not reach the pool environment, but remain confined in the main channel 2 and in the suction duct 7 and are then discharged into the external environment.

Advantageously, the suction duct 7 comprises at least a second plurality of suction holes 8, 9 formed on at least a second wall 80, 90 of the suction duct 7 that does not face the main channel 2.

As explained in more detail below, these additional suction holes 8 and 9 are adapted to suck in air from other areas of the pool, such as the ambient air around or above pool 3. They are therefore suction points present in the region contaminated by DBPs that are normally absent from pools of known types.

Advantageously, the system 1 comprises a secondary channel 10 running parallel to the main channel 2 for collecting water from the deck 11 surrounding the pool 3 of the swimming pool facility, such as for example the washing water of the deck 11 itself, which is often polluted by detergents and/or sanitizers used for cleaning.

The secondary channel 10 is in fluid communication, by means of outlet drains 101 arranged on the bottom of the channel 10 itself, and a relative outlet duct 102, with the building's waste water disposal network 103.

Advantageously, the suction duct 7 runs parallel to both the main channel 2 and the secondary channel 10, wherein the first plurality of suction holes 4 is formed on a first side wall 70 of the suction duct 7 facing the internal volume of the main channel 2, while a second plurality of suction holes 8 is formed on a second side wall 80, opposite the first side wall 70, facing the internal volume of the secondary channel 10.

In fact, as illustrated in the accompanying figures, the suction duct 7 may be interposed between the main channel 2 and the secondary channel 10, so that a first side wall 70 of the suction duct 7 is shared with the main channel 2, while a second side wall 80 of the suction duct 7 is shared with the secondary channel 10. Thus, while the first plurality of suction holes 4 places in communication the internal volume of the main channel 2 with the internal volume of the suction duct 7, the second plurality of holes 8 places in communication the internal volume of the secondary channel 10 with the internal volume of the suction duct 7.

Advantageously, the suction duct 7 includes a third plurality of suction holes 9 formed on an upper third wall 90 of the suction duct 7, wherein said third wall 90 faces the pool environment.

Advantageously, the suction duct 7 includes a plurality of condensate drainage holes 71, which place in fluid connection the internal volume of the suction duct 7 with the internal volume of the secondary channel 10.

In this way, the condensate of harmful and contaminated vapours formed inside the suction duct 7 flows directly to the building's waste water disposal system 103.

Advantageously, the system 1 for the removal of products resulting from the disinfection of water in a swimming pool comprises at least one grate 12, 13 covering at least the main channel 2. This at least one grate 12, 13 is supported by the suction duct 7, which therefore also serves as a support structure for the at least one grate 12, 13 above.

In particular, as illustrated in the accompanying figures, system 1 may comprise two series of grates 12 and 13 side by side.

A first series of grates 12 covers the main channel 2, resting, on one side, on the ridge of the side wall 120 from which the water of the pool 3 overflows into the channel 2 itself, and, on the opposite side, on the upper wall 90 of the suction duct 7.

A second series of grates 13 covers the secondary channel 10, resting, on one side, on a support structure 130 defining a side wall of the secondary channel 10, and on the opposite side, still on the upper wall 90 of the suction duct 7.

In this way, the suction duct 7 acts both as a partition between the main channel 2 and the secondary channel 10 and as a support structure for the grates 12 and 13.

The grates 12, 13 are designed to allow the passage of bathers and service personnel and to allow the drainage of water run-off from bathers to the main channel 2 and the drainage of water on the deck 11 to the secondary channel 10.

Advantageously, the grates 12 and 13 cover and protect all the pluralities of suction holes 4, 8 and 9 in the suction duct 7.

Advantageously, the main channel 2 and/or the suction duct 7 are defined by a plurality of respective modular components aligned and mutually connected.

Furthermore, the secondary channel 10 may also be defined by a plurality of respective modular components aligned and mutually connected.

The suction duct 7 may comprise a plurality of transverse baffles distributed along the longitudinal extension of the duct 7 itself and adapted for separating the internal volume of the suction duct 7 into a plurality of not mutually communicating internal volumes. In this case, each of the internal volumes of the suction duct 7 is in fluid communication with the ventilation means 6, by means of a respective connecting duct 72.

For example, in the case in which the suction duct is defined by a plurality of aligned and mutually connected modular components, each modular component defining a longitudinal section of the suction duct 7 has an internal volume which, in the assembly configuration of the various modular components, is separated from the internal volume of adjoining modular components. In other words, each module that makes up the suction duct 7 as a whole can be closed at the ends.

Figure 2:
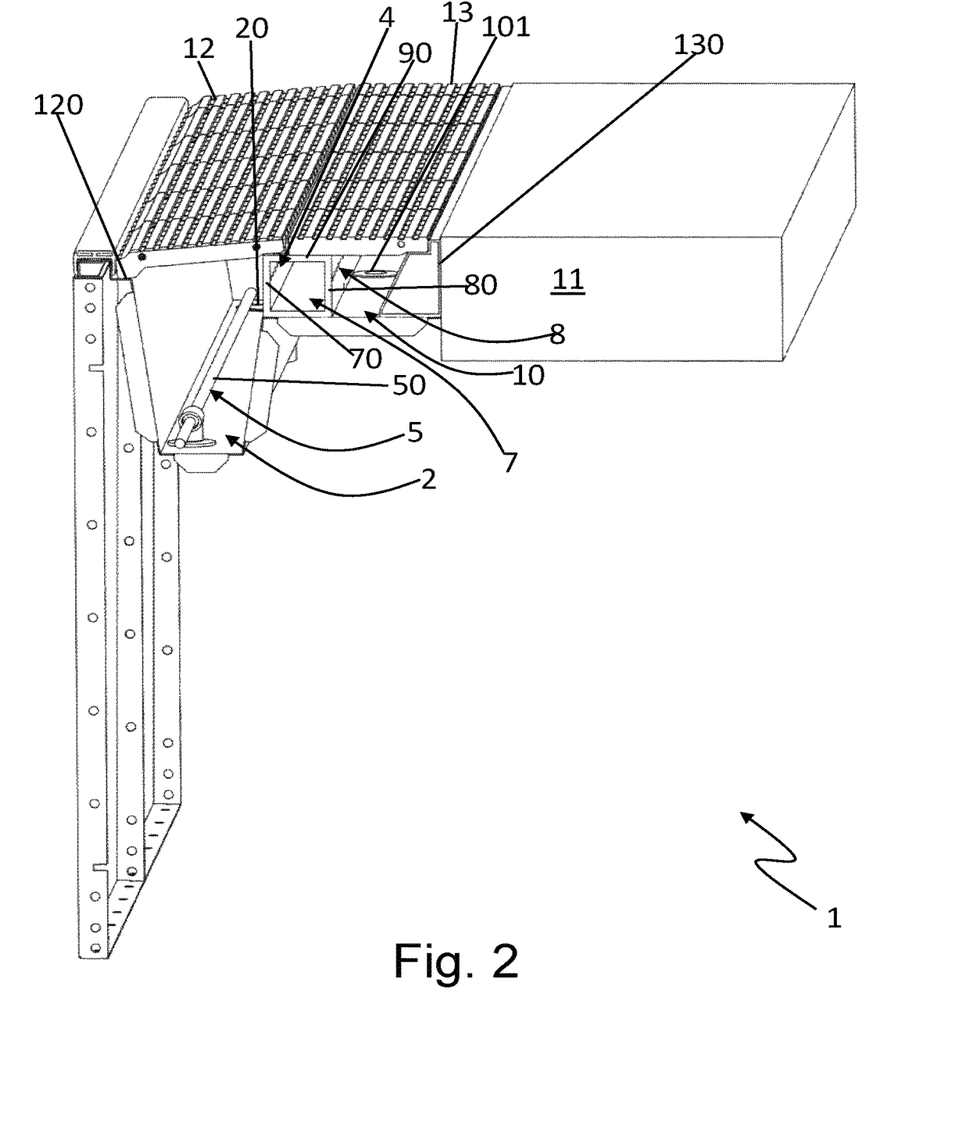
FIG. 2 is a perspective view of a module of the system for the removal of volatile products resulting from the disinfection of water in a swimming pool, according to the invention.
Figure 3:
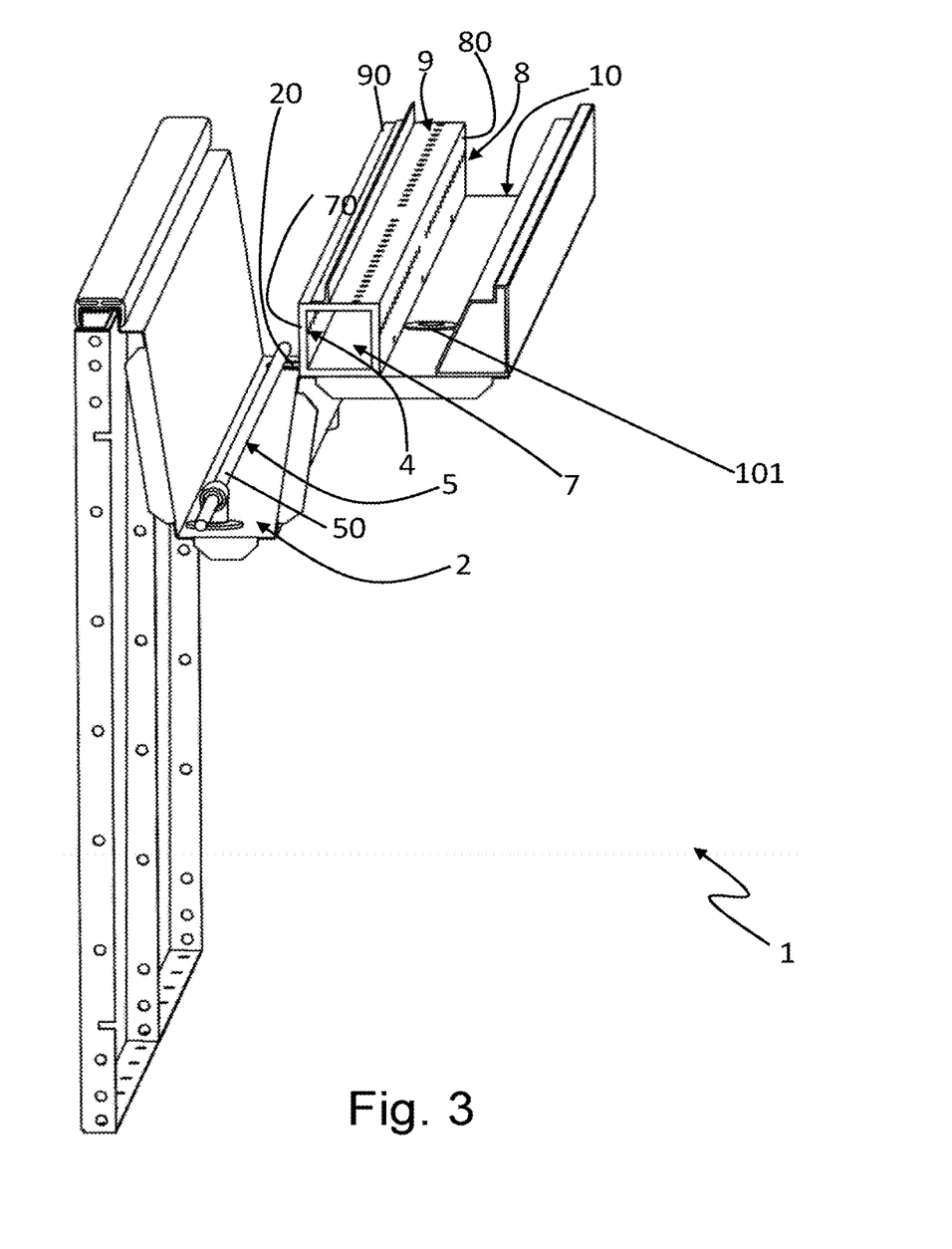
FIG. 3 is a perspective view of the system for the removal of volatile products from the disinfection of water of FIG. 2, without the upper grates.
Figure 4:
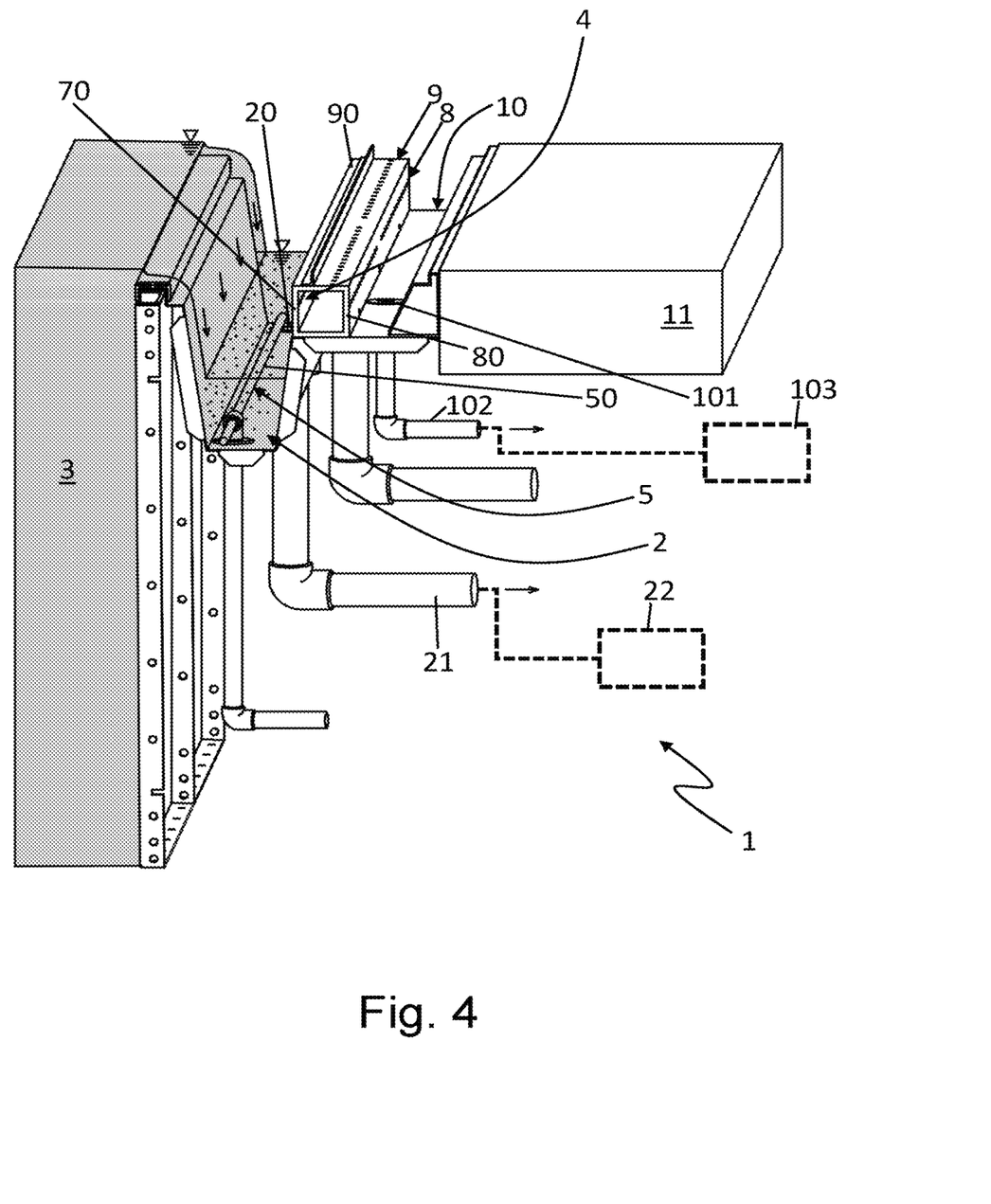
FIGS. 4 and 5 illustrate the system for the removal of volatile products resulting from the disinfection of water of FIG. 3, according to the invention, highlighting respectively the water flows and the air flows involved in its operation.
Figure 5:
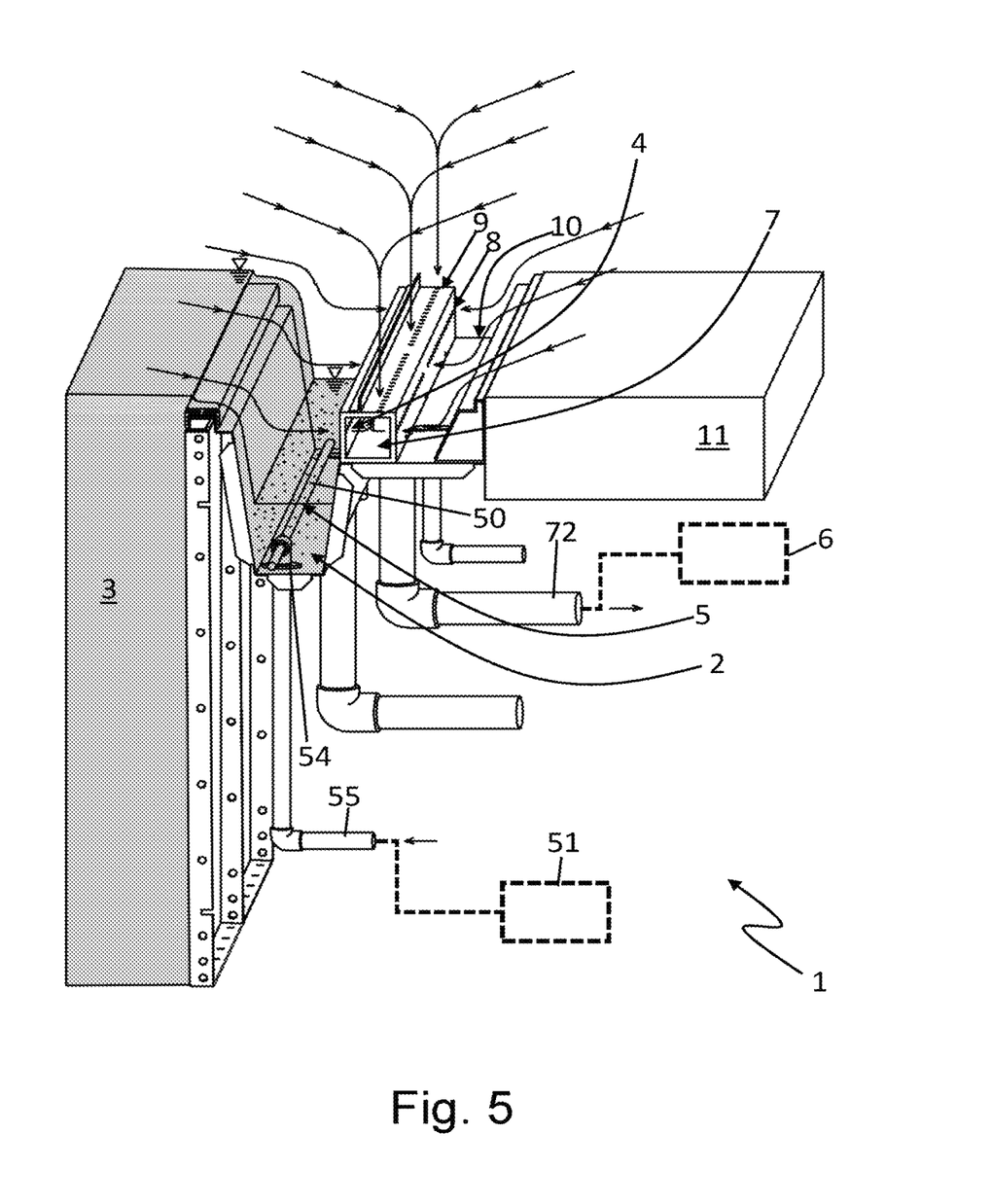

Advantageously, the main components of the system 1, namely the main channel 2, the suction duct 7, the secondary channel 10 and the grates 12 and 13, can all be made in modular components, as illustrated in the accompanying figures. In fact, FIG. 2, illustrates, for example, a single composite module of the system 1 for the removal of products resulting from the disinfection of water in a swimming pool, including:

(i) outlet duct 21 of the main channel 2 to the compensation tank 22, (ii) outlet duct 102 of the secondary duct 102 to the waste water disposal system 103, (iii) connecting duct 72 of the suction duct 7 to the suction means 6 and to the outlet network of the pollutant-rich air to be removed and (iv) coupling body 54 between the perforated duct 50 and the connecting duct 55 in communication with the means for generating the flow of air 51 insufflated into the main channel 2.

The composite channel of the system 1 is therefore created by placing several basic modules in succession to one another.

Preferably, the suction duct 7 is made of plastic, e.g., through extrusion techniques. The main channel 2 and the secondary channel 10 are preferably made of sheet metal, e.g., a single sheet of appropriately bent sheet metal. Such materials are particularly suitable if the system 1 is defined by modular components, as described above.

The various modular components that make up the system 1 for the removal of disinfection products from swimming pool water can in fact be pre-assembled before installation, for example in an existing pool that is to be renovated or in a newly built pool.

Alternatively, the main channel 2 and, if necessary, the secondary channel 10 can be constructed on site, also in masonry, e.g., by using special cladding tiles.

Figure 6:
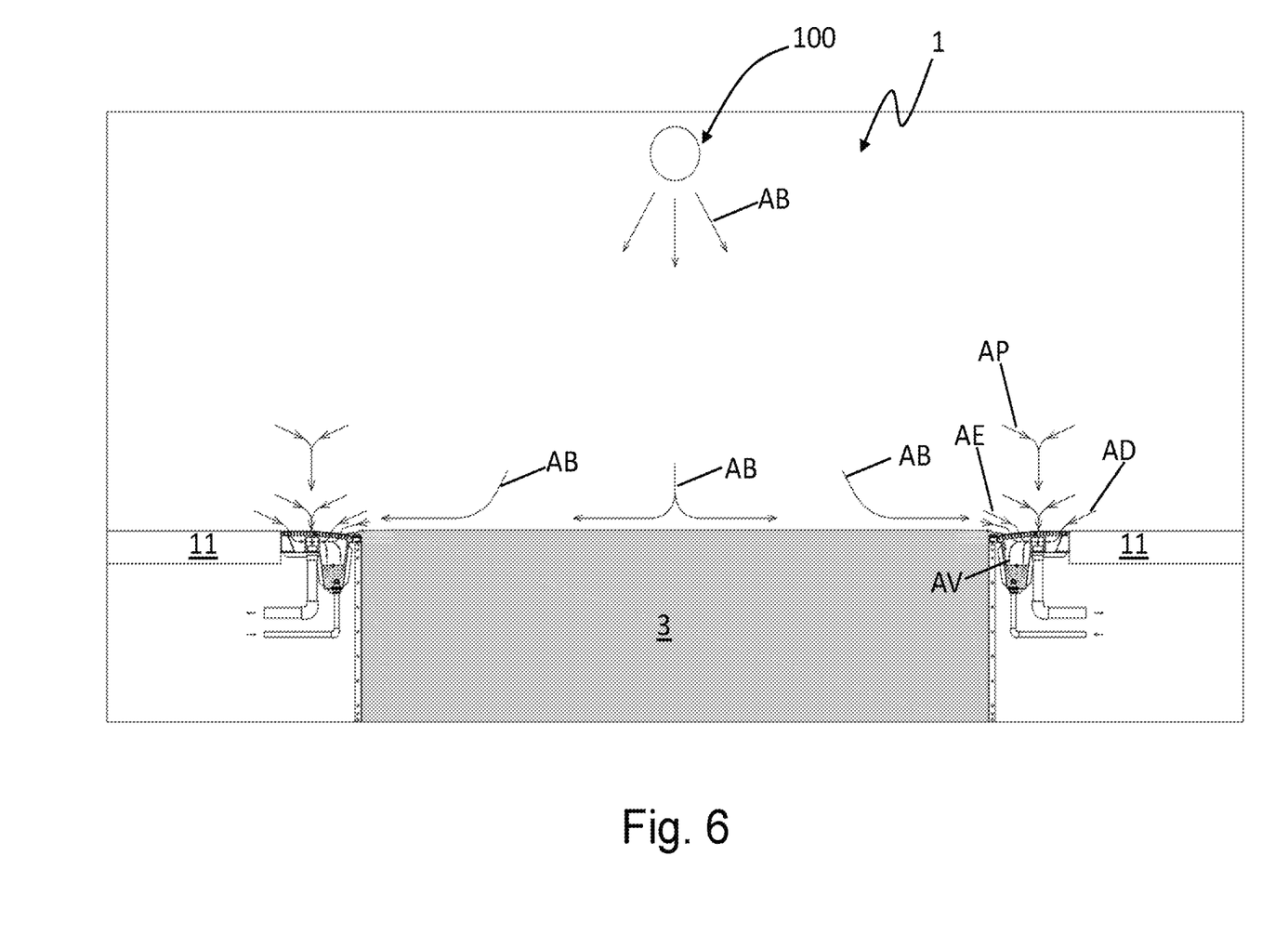
FIG. 6 is a cross-section schematic view of a pool of a swimming pool facility provided with a system for the removal of volatile products resulting from the disinfection of water in a swimming pool, according to the invention.

FIG. 6 shows a section of a pool 3 of the swimming pool facility, in which the system 1 for the removal of products resulting from the disinfection of water occupies both sides of the pool 3 itself.

As illustrated in such figure, the system 1 may cooperate with the ventilation system and/or the HVAC system 100 present in the pool facility, in order to generate a recirculation of the ambient air AB that laps the free water surface of the pool 3 reaching the suction duct 7 of the system 1. In this way, the suction duct 7 operates both the suction of the volatile compounds AV stripped from the water present in the main channel 2, and the suction of the contaminated vapours AE spontaneously evaporating from the water surface of the pool 3, which are pushed by the recirculation of ambient air imposed by the ventilation system and/or the HVAC system 100. Moreover, the presence of the different pluralities of suction holes 4, 8 and 9, distributed in such a way as to be directed towards different areas of the pool (for example, towards the main channel 2, towards the secondary channel 10 and towards the environment above) promotes both the suction of air AP coming from the swimming pool environment surrounding the pool 3, and the suction of air AD coming from the deck 11.

In particular, the suction of air through the suction holes 4 and more generally through the suction duct 7 affects both the air insufflated into the main channel 2 for stripping chloramines and halomethanes and the air flow coming from the surface of the pool 3 generated by the ventilation system and/or the HVAC system 100 of the building. Advantageously, such a system 100 is in fact configured to generate an air flow directed towards the main perimeter channel 2 in order to sweep the surface of the pool 3 to also move the chloramines and halomethanes evaporating directly from the free water surface of the pool 3.

The air is primarily drawn in through the suction holes 4 facing the main channel 2, while the suction holes 9 facing the deck 11 and the suction holes 8 facing the secondary channel 10 also intercept additional air that has escaped the suction through the suction holes 4. The sucked air is then discharged externally to the swimming pool facility and allows part of the air exchange required by the HVAC regulations to be achieved, without the need to modify or increase the performance of the HVAC systems in order to guarantee compliance with the regulations regarding the minimum volume of air recirculation in the unit of time.

In other words, the appropriate cooperation of the system 1 for the removal of products resulting from the disinfection of water with the ventilation system and/or the HVAC 100 system present in the swimming pool enables the effective removal not only of volatile substances actively and forcibly stripped from the water in the main channel 2, but also those which are released spontaneously and directly into the environment. In this scenario, it is planned to run both stripping and suction continuously—at least while the pool filtration system is running—and always at the same time.

Figure 7:
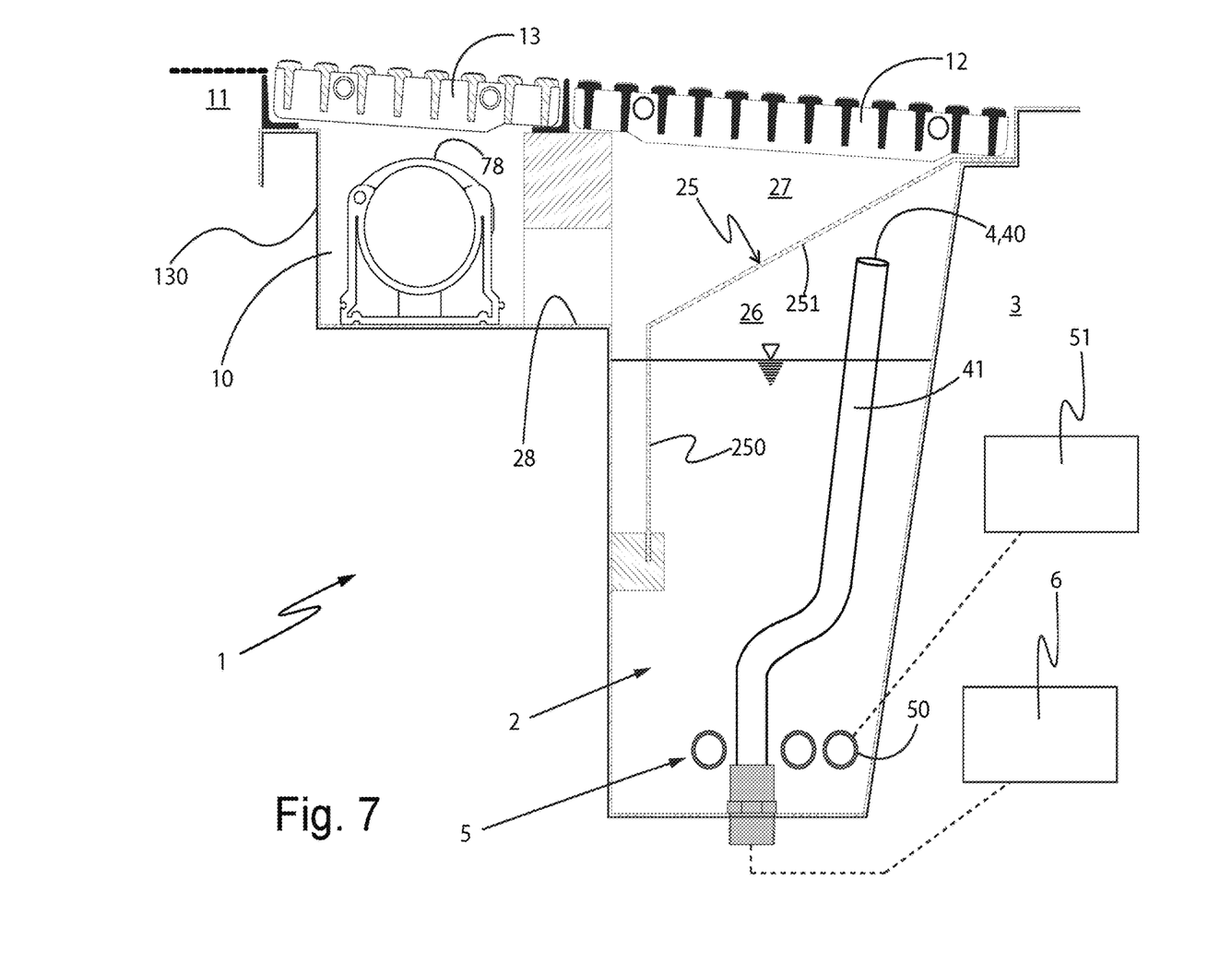
FIG. 7 is a cross-section schematic view of a second embodiment of a system for the removal of volatile products resulting from the disinfection of water in a swimming pool, according to the invention.

Advantageously, as illustrated in FIG. 7 with particular reference to the second embodiment of the system for the removal of volatile products, said system 1 comprises a panel 25 arranged inside the main channel 2 and adapted to divide the volume of air above the free surface of the water present in the main channel 2 itself into a first volume of air 26 arranged between the panel 25 and the free surface of the water and into a second volume of air 27 arranged above the panel 25, wherein the first plurality of suction holes 4 comprises a plurality of open ends 40 of a plurality of suction tubes 41, and wherein such open ends 40 of the suction tubes 41 are arranged within the first volume of air 26 arranged between the panel 25 and the free surface of the water, to suck in the air present in the first volume of air 26, which is rich in volatile and harmful gaseous components that have been stripped by means of the air insufflation device 5.

Advantageously, the panel 25 extends along the longitudinal extension direction of the main channel 2 and is adapted to retain inside the first closed volume of air 26, the volatile components obtained from the stripping of the water present in the main channel 2, in order to prevent them from reaching the surface of the swimming pool and therefore swimmers and operators in and around the pool.

Advantageously, the panel 25 comprises an immersed portion 250 immersed in the water present in the main channel 2, and an emerged portion 251, adapted to define with the free surface of the water the first, closed, volume of air 26. The fact that the panel 25 always has an immersed portion 250 helps to keep the two air volumes 26 and 27 separate from each other and to confine the volatile products within the first, close, air volume 26 only.

Advantageously, the system 1 comprises a plurality of suction pipes 41 distributed within the main channel 2 along the longitudinal extension direction of the main channel 2 itself.

Advantageously, such suction pipes 41 are connected to, i.e., in fluid communication with, ventilation means 6, for example, as illustrated in FIG. 7, at the bottom of the main channel 2.

Advantageously, the emerged portion 251 of the panel 25, which is located below the first series of grates 12, is sloping, so as to allow any water that passes through the grate 12 located above to flow into the main channel 2 itself.

As illustrated in FIG. 7, the second embodiment of the invention may also comprise a secondary channel 10, preferably flanking the main channel 2, and preferably surmounted by a second series of grates 13.

A passageway 28 may be provided between the main channel 2 and the secondary channel 10, for example to collect any excess water overflowing from the main channel 2.

Such secondary channel 10 may be comprised of a separate channel, appropriately associated with the main channel 2, or it may be an extension of the main channel 2.

Advantageously, the system 1, according to the second embodiment, comprises a suction duct 78 configured to suck in ambient air. The ambient air suction duct 78 can also be connected to the ventilation means 6.

In contrast to the first embodiment of the system 1, wherein the suction duct 7 is adapted to suck in both air containing harmful volatile gases stripped from the water present in the main channel 2 and ambient air, in the case of the second embodiment the suction duct 78 is adapted to suck in ambient air, while the suction pipes 41 are adapted to suck in air containing harmful volatile gases stripped from the water present in the main channel 2 and retained by the panel 25 in the first volume 26.

Advantageously, as illustrated in FIG. 7, the ambient air suction duct 78 may be placed within the secondary channel 10 or, for example in the event that the secondary channel 10 is absent, within the main channel 2 itself, within the second air volume 27.

The operation of the system for the removal of volatile products resulting from the disinfection of water in a swimming pool according to the second embodiment of the invention is substantially corresponding to the operation of the first embodiment, the main difference being constituted by the fact that the panel 25 constitutes a physical barrier to the passage of volatile and harmful components stripped from the water present in the main channel 2 towards the surrounding environment, operative even when, for whatever reason, the ventilation means 6 and/or the suction pipes 41, and ultimately the suction holes 4, may be momentarily inoperative.

In practice, the system for the removal of volatile products resulting from the disinfection of water in a swimming pool, according to the present invention, fulfils the task as well as the intended purposes as it enables the effective removal of volatile substances generated by the disinfection of water in a swimming pool, preventing them from reaching bathers and service personnel.

Another advantage of the system for the removal of products resulting from the disinfection of water in a swimming pool, according to the invention, is that it guarantees the treatment of all the recirculating water in the pool.

A further advantage of the system for the removal of volatile products resulting from the disinfection of water in a swimming pool, according to the invention, is that the stripping of the harmful volatile substances is forced to take place in a confined and controllable space, in order to prevent these volatile substances from reaching the environment where bathers and service personnel are present, from which they are actually more difficult to remove.

Another advantage of the system for the removal of volatile products resulting from the disinfection of water in a swimming pool, according to the invention, is that it is modular and therefore easily transportable and can be pre-assembled and installed both in pools to be renovated and in newly built pools.

A further advantage of the system for the removal of volatile products resulting from the disinfection of water in a swimming pool, according to the invention, is that the suction duct also performs a structural function in supporting the grates, thus limiting the number of components required to build a solid and durable structure.

Another advantage is that the main and secondary channels can be made very easily, for example by bending a single sheet of metal.

Another advantage of the system for the removal of volatile products resulting from the disinfection of water in a swimming pool, according to the invention, consists of the fact that it has a high suction efficiency, thanks to the presence of several series of variously directed suction holes.

Yet another advantage is that it protects the technical room where the compensation tank is located, and the machinery contained therein, from the exhalation of harmful and corrosive gases.

A further advantage of the system for the removal of volatile products from the disinfection of water in a swimming pool, according to the invention, is that the suction of DBPs takes place at the so-called "breath zone".

Another advantage of the system for the removal of volatile products resulting from the disinfection of water in a swimming pool, according to the invention, is the fact that it can be integrated with any existing HVAC systems, as the volume of air sucked in by the system in the unit of time is compatible with the volumes of air sucked in and consequently reintroduced by the HVAC systems as required by the relevant regulations. According to the invention, the presence of the system does not imply any increase in the size of the existing HVAC system, if any, in order for it to continue performing according to the regulatory requirements.

The system for the removal of volatile products resulting from the disinfection of water in a swimming pool thus conceived is susceptible to numerous modifications and variations, all of which fall within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A system for removal of volatile products resulting from disinfection of water in a swimming pool, comprising:
   a main channel configured to be arranged at at least one edge of a pool of a swimming pool facility and to collect overflowing water from said pool,
   a first plurality of air suction holes distributed along an extension direction of said main channel, said suction holes of said first plurality of suction holes facing an internal volume of said main channel and being arranged at a height above a free water surface present in said main channel,
   ventilation means configured to generate a suction flow of air from said first plurality of suction holes,
   wherein said system comprises an air insufflation device arranged in said main channel at a height below the free surface of the water present in said main channel, said air insufflation device being adapted to generate a flow of air adapted to strip gases dissolved in the water present in said main channel, from a liquid phase to a gaseous phase, and in that said first plurality of suction holes sucks in said gases to remove them from said main channel.

2. The system for removing volatile products resulting from the disinfection of water in a swimming pool, according to claim 1, wherein said air insufflation device comprises means for generating a flow of air in fluid communication with a perforated duct which extends along the extension direction of said main channel, the perforated portion of said perforated duct being immersed in the water present in said main channel.

3. The system for removing volatile products resulting from the disinfection of water in a swimming pool, according to claim 1, said system further comprising a suction duct which extends parallel to said main channel, said first plurality of suction holes being obtained on a first wall of said suction duct facing said internal volume of said main channel, said suction duct being in fluid communication with said ventilation means.

4. The system for removing volatile products resulting from the disinfection of water in a swimming pool according to claim 3, wherein said suction duct comprises at least a second plurality of suction holes obtained on at least a second wall of said suction duct which does not face said main channel.

5. The system for removing volatile products resulting from the disinfection of water in a swimming pool, according to claim 3, said system further comprising at least one grate covering at least said main channel, said at least one grate being supported by said suction duct.

6. The system for removing volatile products resulting from the disinfection of water in a swimming pool, according to claim 3, wherein said suction duct comprises a plurality of transverse baffles distributed along a longitudinal extension of said suction duct adapted to separate an internal volume of said suction duct into a plurality of internal volumes that are not mutually communicating.

7. The system for removing volatile products resulting from the disinfection of water in a swimming pool, according to claim 3, wherein said system is adapted to cooperate with a ventilation system and/or an HVAC system present in a swimming pool to generate a recirculation of air that laps against a free water surface of said pool and reaches said suction duct.

8. The system for removing volatile products resulting from the disinfection of water in a swimming pool, according to claim 1, said system further comprising a secondary channel running parallel to said main channel adapted to collect water from a deck surrounding said pool of said swimming pool facility.

9. The system for removing volatile products resulting from the disinfection of water in a swimming pool, according to claim 8, said system further comprising a suction duct in fluid communication with said ventilation means, said suction duct running parallel to said main channel and to said secondary channel, said first plurality of suction holes being formed on a first side wall of said suction duct, said first wall facing said internal volume of said main channel, a second plurality of suction holes being formed on a second side wall of said suction duct, opposite said first side wall, said second wall facing the internal volume of said secondary channel.

10. The system for removing volatile products resulting from the disinfection of water in a swimming pool, according to claim 9, wherein said suction duct comprises a third plurality of suction holes obtained on an upper third wall, said third wall facing the environment of said swimming pool.

11. The system for removing volatile products resulting from the disinfection of water in a swimming pool, according to claim 9, wherein said suction duct comprises a plurality of condensate drainage holes, said condensate drainage holes placing in fluid communication the internal volume of said suction duct with the internal volume of said secondary channel.

12. The system for the removal of volatile products resulting from the disinfection of water in a swimming pool, according to claim 8, said system further comprising at least one first grate covering at least said main channel and at least one second grate covering said secondary channel, said at least one first grate and said at least one second grate being both supported by a suction duct.

13. The system for removing volatile products resulting from the disinfection of water in a swimming pool, according to claim 1, wherein said main channel and/or a suction duct are defined by a plurality of respective modular components aligned and mutually connected.

14. The system for removing volatile products resulting from the disinfection of water in a swimming pool, according to claim 1, wherein said first plurality of suction holes is formed on a wall of said main channel facing said internal volume of said main channel.

15. The system for removing volatile products resulting from the disinfection of water in a swimming pool, according to claim 1, said system further comprising a panel arranged within said main channel and adapted to divide a volume of air above the free water surface present in said main channel into a first volume of air arranged between said panel and said free water surface, and into a second volume of air arranged above said panel, said first plurality of suction holes being constituted by a plurality of open ends of a plurality of suction pipes, wherein said open ends of said suction pipes are arranged in said first volume of air arranged between said panel and said free water surface.

* * * * *